Figure 1:
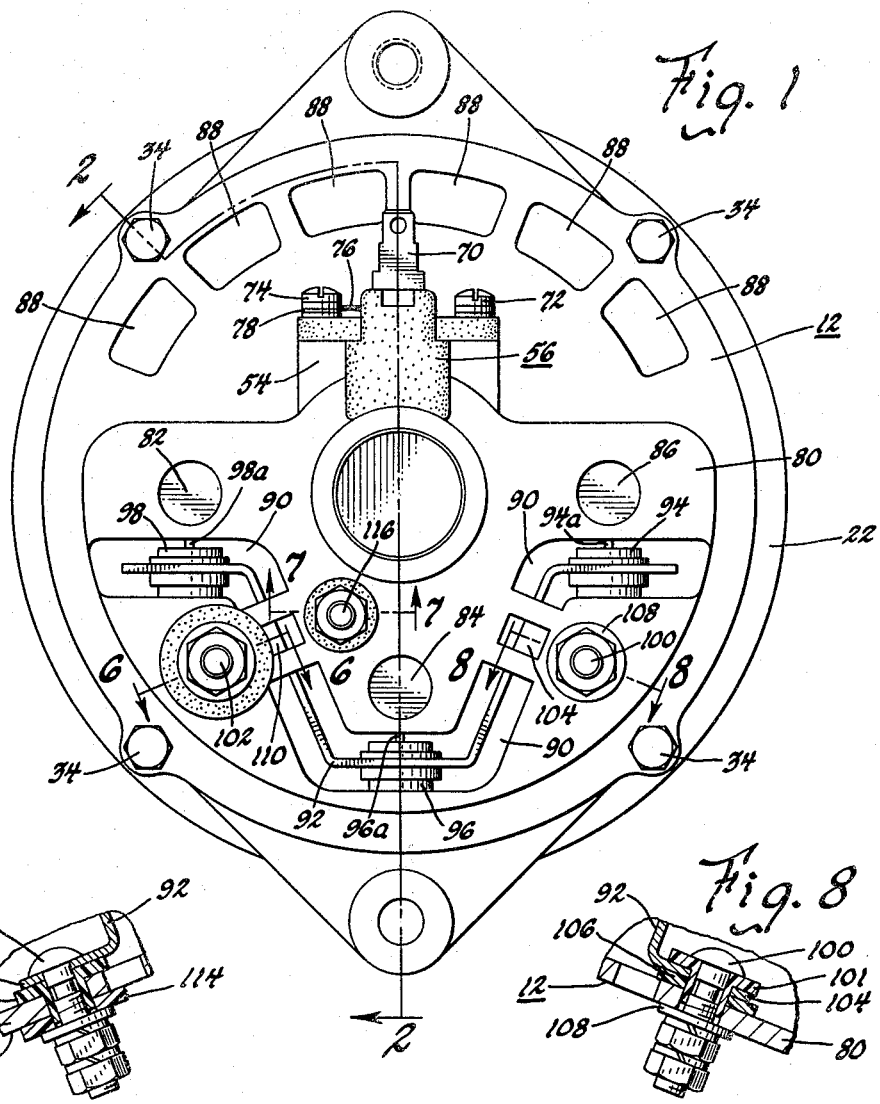

Aug. 25, 1964    C. E. BATES ETAL    3,146,362
DYNAMOELECTRIC MACHINE

Filed Aug. 3, 1961    4 Sheets-Sheet 1

INVENTORS
Charles E. Bates
William E. Brown
David C. Redick
James F. Ault
Orza D. Heiny
Lilburn Stottlemeyer
BY
C. R. Meland
THEIR ATTORNEY INVENTORS
Charles E. Bates
William E. Brown
David C. Redick
James F. Ault
Orza D. Heiny
Lilburn Stottlemeyer
BY
C. R. Meland
THEIR ATTORNEY INVENTORS
Charles E. Bates
William E. Brown
David C. Redick
James F. Ault
Orza D. Heiny
Lilburn Stottlemeyer
BY
C. R. Meland
THEIR ATTORNEY Aug. 25, 1964

C. E. BATES ETAL 3,146,362

DYNAMOELECTRIC MACHINE

Filed Aug. 3, 1961

4 Sheets-Sheet 4

INVENTORS
Charles E. Bates
William E. Brown
David C. Redick
James F. Ault
Orza D. Heiny
Lilburn Stottlemeyer
BY
C. R. Meland
THEIR ATTORNEY

United States Patent Office

3,146,362
Patented Aug. 25, 1964

3,146,362
DYNAMOELECTRIC MACHINE
Charles E. Bates, William E. Brown, David C. Redick, James F. Ault, and Lilburn Stottlemeyer, Anderson, and Arza D. Heiny, Carmel, Ind., assignors to General Motors Corporation, Detroit, Mich., a corporation of Delaware
Filed Aug. 3, 1961, Ser. No. 129,075
8 Claims. (Cl. 310—68)

This invention relates to dynamoelectric machines wherein an alternating current is generated in the output winding of the machine and is rectified to direct current by a plurality of built-in rectifiers.

One of the objects of this invention is to provide a dynamoelectric machine that has a three phase, A.C. output winding and has a three phase full wave bridge rectifier system comprised of three rectifiers that are mounted directly in the end frame of the machine and three other rectifiers which are mounted in a heat sink that is electrically insulated from the end frame.

Another object of this invention is to provide a dynamoelectric machine that has a three phase A.C. output winding and has a three phase full wave bridge rectifier system that is comprised of three rectifiers mounted directly in the end frame of the generator and three other rectifiers mounted in a heat sink that is electrically insulated from the end frame, the rectifiers in the end frame and in the heat sink being substantially in exact alignment whereby the connections between the rectifiers may be made as short as possible.

Still another object of this invention is to provide a dynamoelectric machine having an A.C. output winding with a metal heat sink member that carries one or more rectifiers for rectifying the A.C. output of the output winding and wherein the heat sink member is mounted in alignment with an opening formed in the end frame of the generator, the metal heat sink member being of substantially U-shaped configuration and the opening being of U-shaped configuration whereby air entering the opening can contact the entire heat sink assembly to thereby cool the rectifiers that are mounted thereon.

A further object of this invention is to provide a dynamoelectric machine wherein the end frame of the machine carries a heat sink member which in turn carries a plurality of rectifiers and further wherein the direct current terminals of the machine are used to hold the heat sink member in place.

Still another object of this invention is to provide a dynamoelectric machine with a brush holder that is readily accessible for the changing of brushes and which includes a projecting male terminal that is easily connected with a complementary female terminal.

Further objects and advantages of the present invention will be apparent from the following description, reference being had to the accompanying drawings wherein preferred embodiments of the present invention are clearly shown.

Figure 2:
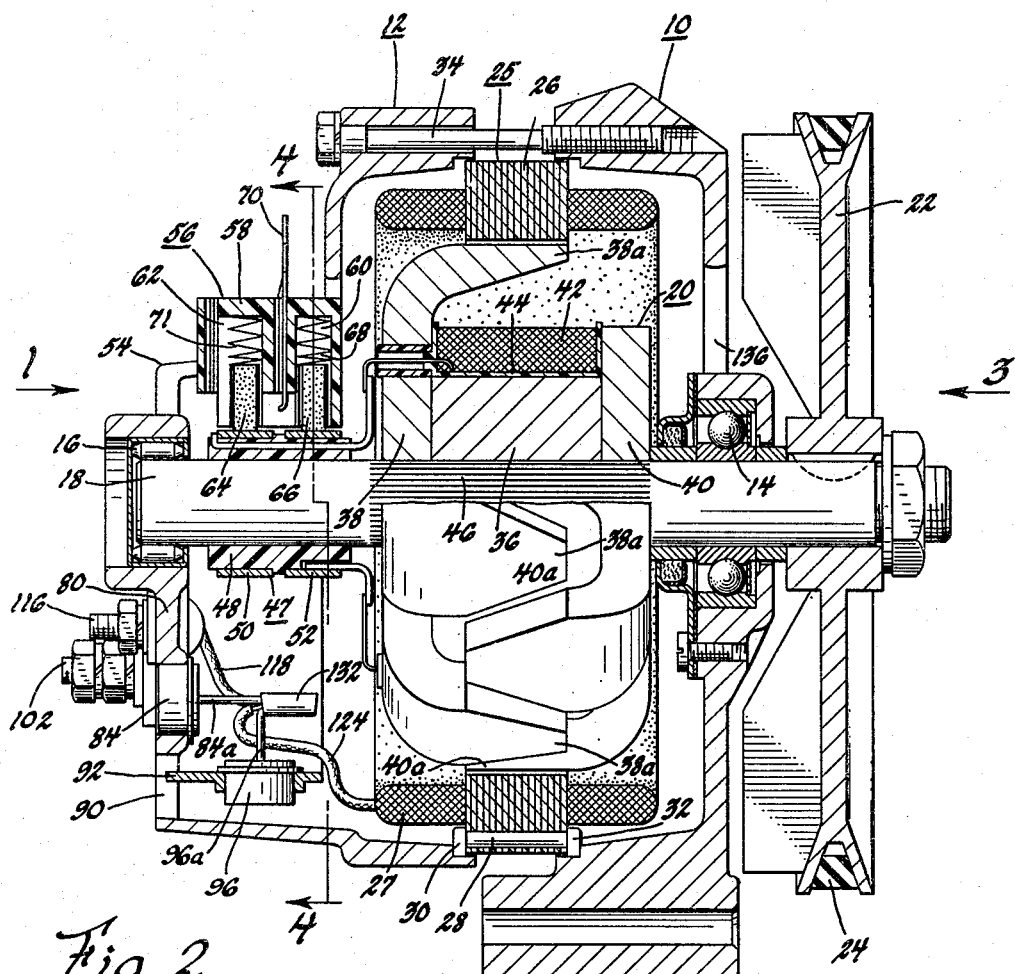
Figure 5:
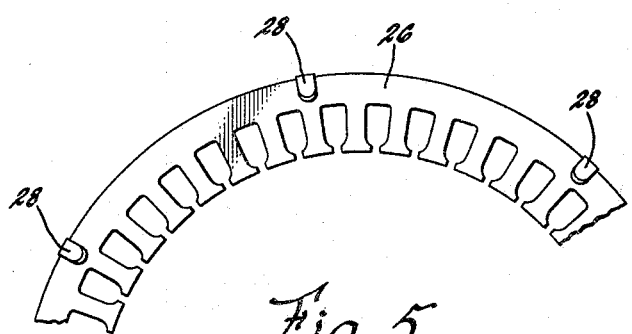
Figure 3:
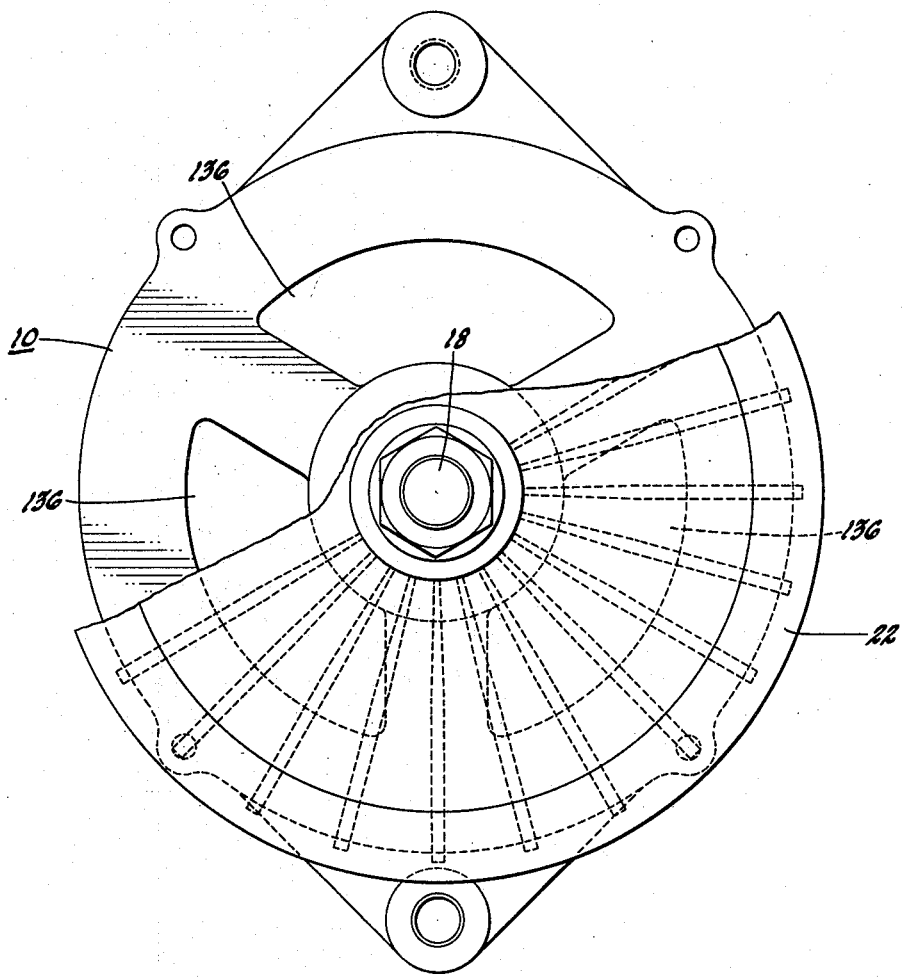
Figure 4:
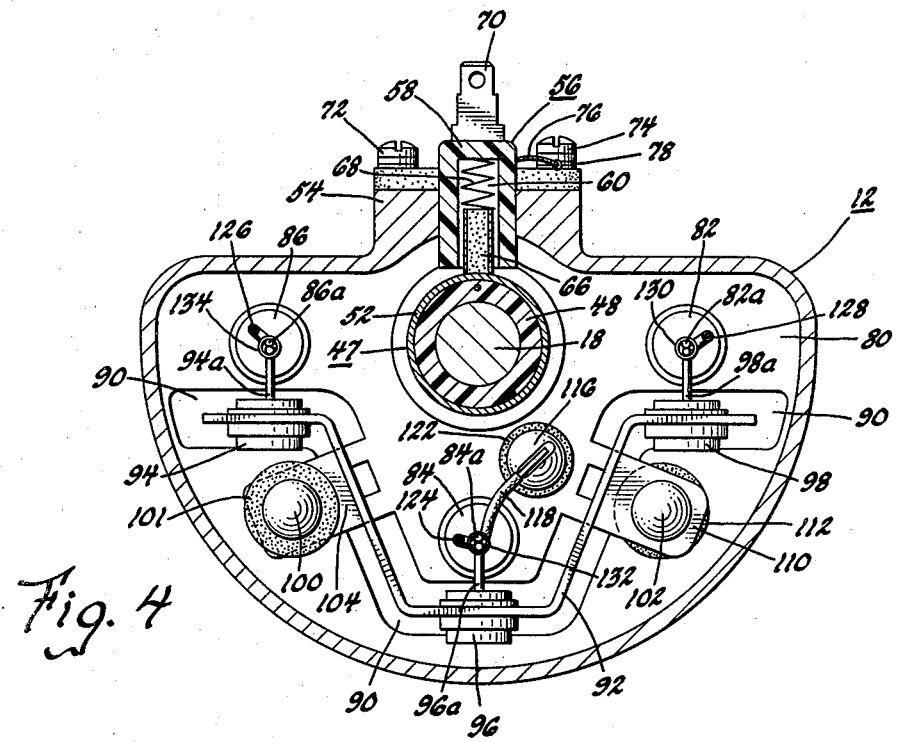
Figure 9:
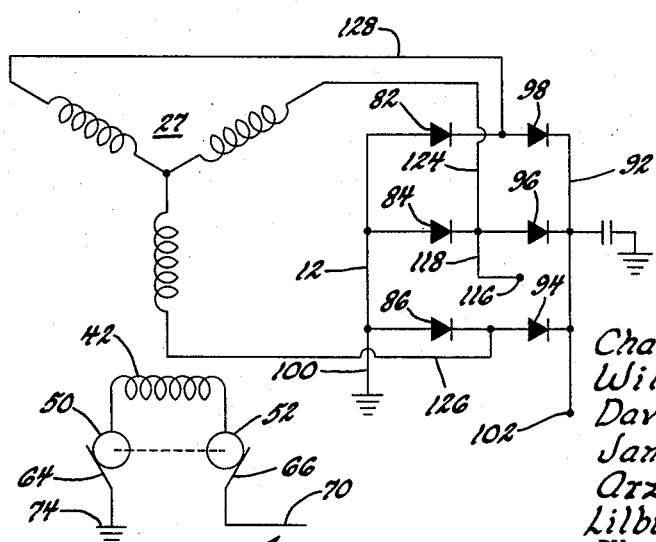

In the drawings:
FIGURE 1 is an end view of a dynamoelectric machine made in accordance with this invention.
FIGURE 2 is a sectional view taken along line 2—2 of FIGURE 1.
FIGURE 3 is an end view opposite to that of FIGURE 1 of the dynamoelectric machine made in accordance with this invention.
FIGURE 4 is a sectional view taken along line 4—4 of FIGURE 2.
FIGURE 5 is a partial plan view of a stator illustrating the method of holding the stator laminations together.
FIGURE 6 is a sectional view taken along line 6—6 of FIGURE 1.
FIGURE 7 is a sectional view taken along line 7—7 of FIGURE 1.
FIGURE 8 is a sectional view taken along line 8—8 of FIGURE 1.
FIGURE 9 is a schematic electric circuit diagram of the dynamoelectric machine which is illustrated in FIGURES 1 through 8.

Referring now to the drawings and more particularly to FIGURE 2, it is seen that the dynamoelectric machine comprises a pair of end frames 10 and 12 formed of metal material, for example, die cast aluminum. The end frame 10 carries a ball bearing which is generally designated by reference numeral 14. The end frame 12 carries a roller bearing 16 and bearings 14 and 16 support a shaft 18 which forms a part of a rotor which is generally designated by reference numeral 20. A combined pulley and fan 22 is connected with the shaft 18 and a belt 24 is shown engaging the pulley for driving the combined pulley and fan and the shaft 18. The belt 24 of course will be driven by an internal combustion engine if the dynamoelectric machine is used on a motor vehicle but of course may be driven by any source of power depending upon the installation.

The end frames 10 and 12 support a stator which is generally designated by reference numeral 25. The stator 25 includes the usual steel stator laminations 26 which are held together by a plurality of circumferentially spaced rivets 28 having heads 30 and 32. The stator laminations carry a three phase Y-connected stator winding 27. The end faces of the rivet heads 30 and 32 are machined flat and engage machined surfaces in the end frames 10 and 12 to locate the stator assembly 25 with respect to the end frames 10 and 12. The rivets 28 serve two purposes, namely they hold the stator laminations 26 together and also serve to correctly position the stator assembly 25 with respect to the end frames 10 and 12. It is seen that the end frames 10 and 12 are held together by the through bolts 34.

The rotor assembly 20 in addition to the shaft 18 comprises a metal core member 36 formed of magnetic material, pole members 38 and 40 likewise formed of a magnetic material and a field coil winding 42 which is wound on a spool 44 formed of insulating material. The metal core member 36 and the pole members 38 and 40 are press fitted to a splined or knurled portion of the shaft which is designated by reference numeral 46. The pole member 38 has a plurality of axially extending fingers 38a whereas the pole member 40 has a plurality of axially extending fingers 40a. The fingers 38a and 40a interleave with one another as is clearly apparent from FIGURE 2. These fingers rotate in close proximity to the inner surface of the stator laminations 26 as is apparent from the drawings.

The shaft 18 carries a slip ring assembly 47 comprised of a member 48 formed of insulating material which carries the slip rings 50 and 52. The two lead wires for the field winding 42 are brought through insulated openings in the pole member 38 and are connected respectively with the slip rings 50 and 52 as is apparent from FIGURE 2. These lead wires may be bonded to pole member 38 to hold them in place.

The end frame 12 has a projecting section 54 formed with an opening that receives a brush holder assembly generally designated by reference numeral 56. The main body portion 58 of the brush holder assembly is formed of a suitable plastic insulating material and has cavities 60 and 62 which receive the brushes 64 and 66 and also receive the springs 68 and 71 which urge the brushes into engagement with the slip rings 50 and 52. The main body portion 58 of the brush holder assembly is formed with a longitudinally extending slot which receives a male terminal 70. The male terminal is snap fitted in the brush holder 58 and is connected with the brush 66 by a suitable lead wire which is not illustrated. The brush holder 56 is held fixed with respect to the end frame 12 by means of fasteners 72 and 74 which are illustrated in FIGURE 4. The brush 64 is connected with a lead wire 76 which in turn is connected with an annular terminal 78 through which passes the fastener 74 for securing the brush holder assembly 56 to the end frame 12. The brush 64 is thus electrically connected with the end frame 12 whereas the brush 66 is connected with the male terminal 70. The male terminal 70 of course will be connected with a suitable voltage regulator which as is well-known to those skilled in the art is connected between the rectifier output terminals of the machine and the field winding 42.

The end wall 80 of the end frame 12 is formed with three openings which receive the rectifiers or diodes 82, 84 and 86. The rectifiers or diodes 82, 84 and 86 are each of the pn junction semiconductor type and preferably are of the silicon type. Since the rectifiers 82, 84 and 86 are identical only one of them will be described in detail, it being understood that the other two are the same. Taking diode 84 as an example and referring more particularly to FIGURE 2, it is seen that the diode 84 has an outer metal case and this case is press-fitted in the opening in the end wall 80. The diode 84 has a relatively stiff terminal conductor 84a and the case of the diode 84 and the terminal conductor 84a form opposite electrical connections for the rectifying junction of the diode. In this particular instance, it is intended that the system be a negative ground system wherein the cases of the diodes 82, 84 and 86 are such that the end frame 12 will be at a negative potential. It is pointed out that the polarities of diodes 82, 84 and 86 must be identical, that is, the metal case of each diode must be of the same polarity and the same is true for the terminal conductors of the diodes.

It can be seen from FIGURES 1 and 2 that the end frame 12 is formed with a plurality of circumferentially spaced air inlet openings 88 and also with a substantially U-shaped air inlet opening designated in its entirety by reference numeral 90. The total length of opening 90 is greater than the outside diameter of the dynamoelectric machine. Positioned directly behind the U-shaped air inlet opening 90 and conforming to the shape of this air inlet opening is a metal heat sink member designated in its entirety by reference numeral 92. The metal heat sink member 92 has three openings in which are press fitted the diodes or rectifiers 94, 96 and 98. The diodes 94, 96 and 98 are identical with diodes 82, 84 and 86 with the exception that they are of a reversed polarity, that is the outer metal cases of the diodes 94 through 98 have a different case polarity than the diodes 82 through 86. The heat sink 92 is formed of sheet aluminum material and has bosses surrounding the openings which receive the diodes 94, 96 and 98. The heat sink 92 can be formed of cast aluminum material and can be a die casting.

The heat sink 92 is held to the end wall 80 of the end frame 12 by the terminal studs 100 and 102. The terminal stud 100 as is best illustrated in FIGURE 8 passes through an opening formed in the end wall 80 of the end frame 12. An insulator member 101 insulates the terminal stud 100 from a mounting extension 104 formed integral with the metal heat sink 92. A washer 106 formed of insulating material is engageable with the mounting extension or flange 104 of the heat sink 92 to insure that the heat sink 92 is completely insulated from the terminal stud 100 and insulated from the end wall 80 of the end frame 12. The terminal stud 100 has a threaded portion which is best illustrated in FIGURE 8 that is engaged by nuts to hold the terminal stud 100 in place. The terminal stud 100 is electrically connected with the end wall 80 of the end frame 12 by the metal washer 108. It thus is seen that the terminal stud 100 has the same electrical potential as the end wall 80 and therefore will have the same electrical potential as the outer metal cases of the rectifiers 82, 84 and 86.

As shown in FIGURE 6, the mounting extension or flange portion 110 of the heat sink 92 is insulated from the end wall 80 by the washers 112 and 114 which are formed of a suitable insulating material. The head of the terminal stud 102 directly engages the mounting extension 110 of the heat sink 92 so that the terminal 102 is at the same electrical potential as the heat sink 92 and therefore is at the same electrical potential as the case side of rectifiers 94, 96 and 98. It is seen that the terminal stud 102 like terminal stud 100 has a threaded portion which receives the nuts illustrated in FIGURE 6. The terminal stud 102 may be termed a battery terminal stud since it will be the positive side of a three phase full wave bridge rectifier network that is made up of the diodes mounted in the end frame and the diodes mounted in the heat sink 92. This is better illustrated in the schematic circuit diagram of FIGURE 9.

The end wall 80 of end frame 12 carries another terminal stud which is designated by reference numeral 116 and which is best illustrated in FIGURE 7 of the drawings. The head of the terminal stud 116 is slotted and this slot receives the end of a conductor 118 which is soldered, welded or otherwise secured to the head of this terminal stud. The terminal stud 116 passes through an opening in the end wall 80 and is electrically insulated from the end wall 80 by the insulating washers 120 and 122.

Referring now more particularly to FIGURES 2 and 4, it is seen that the terminal lead 84a of diode 84 is connected with the terminal lead 96a of the rectifier 96. In addition, the terminal leads 84a and 96a are connected with a lead wire 124 which is connected to one of the phase windings of the three phase stator winding 27. This junction of terminal wires 84a and 96a and conductor 124 is also connected with the lead wire 118 which as can be seen from FIGURE 7 is connected with the terminal stud 116. The terminal stud 116 is thus connected to the junction of rectifiers 84 and 96 and may be used to operate relays or other devices where it is desired to actuate such a relay from a junction point of two rectifiers of a bridge rectifier and from an output terminal of the bridge rectifier. In other words, in FIGURE 9, a relay coil could be connected between one output terminal of the bridge rectifier and the terminal 116.

The terminal lead wire 86a of rectifier 86 is connected with the terminal lead wire 94a of rectifier 94 and both of these terminals are connected with a lead wire 126 which is connected with another phase winding of the three phase stator winding 27. In a similar fashion, the wire terminal 98a of rectifier 98 and the terminal 82a of rectifier 82 are connected together and with a lead wire 128 which comes from another phase winding of the three phase stator winding 27.

It can be seen from FIGURES 2 and 4 that the pairs of rectifiers, for example, rectifiers 82 and 98 are mounted in the same common plane with the terminals 82a and 98a being at right angles to each other. The same is true of paired rectifiers 84 and 96 and 86 and 94. With this arrangement, it is a simple matter to make the electrical connections between the terminal leads of the rectifiers and also with the lead wires that come from the stator winding. The connections between the terminals of the rectifiers and the lead wires coming from the stator winding are made by connectors 130, 132 and 134 which encircle the various terminals and conductors and which are crimped to hold the conductors tightly in place. In the case of connector 132, it also serves to connect the lead wire 118 to the stator lead wire 124 and the terminals 84a and 96a of the rectifiers. The terminals of the rectifiers 94, 96 and 98 are bent at a right angle so that the bent portion is parallel with the terminals of the rectifiers 82, 84 and 86 which are mounted in the end wall 80.

Referring now more particularly to FIGURE 3, it is seen that the end frame 10 is provided with air outlet openings 136. When the generator is operating and the combined fan and pulley 22 is rotating, it will be apparent that air is drawn out of the generator through these openings 136.

It can be seen from the foregoing description of the dynamoelectric machine illustrated in FIGURES 1 through 8 and in the schematic diagram of FIGURE 9 that a generator has been provided that has a direct current output that will be taken across terminal studs 100 and 102. It can be seen from FIGURE 9 that the stator windings of the stator 27 are connected with the rectifiers and that the end frame 12 is at one electrical potential and the heat sink 92 is at another electrical potential. The rectifiers are thus physically connected to provide a three phase full wave bridge rectifier network, the output of which appears across the terminals 100 and 102.

In the operation of the dynamoelectric machine it will be apparent that when the field winding 42 is supplied with direct current for example from the bridge rectifier and through some sort of voltage regulating means, a flux is generated by the field winding. This flux links with the stator laminations 26 and as the rotor 20 rotates, an alternating curent is induced in the stator winding 27. This alternating current is rectified by the diodes or rectifiers which are mounted respectively in the end wall 80 of the end frame 12 and in the heat sink 92. As the rotor is rotated, the combined fan and pulley 22 pulls air into the dynamoelectric machine through the openings 88 and also through the U-shaped slot or opening 90 that is in direct alignment with the heat sink 92. This air thus serves to cool the heat sink 92 and the rectifiers and in flowing between the end frame 12 and out through the openings 136 in the end frame 10 serves to cool the stator winding 27 and to some extent, the field winding 42. It will of course be appreciated that field current is supplied to the field winding 42 via the slip rings 50 and 52, and the brushes 64 and 66. In actual practice, the spade terminal 70 is connected to one side of the voltage regulator whereas the opposite side of the regulator will be energized from the bridge rectifier network. The brush 64 is connected directly to ground as has been explained hereinbefore.

It thus can be observed from FIGURES 1 through 8 that a very compact dynamoelectric machine has been provided which has built-in rectifiers and which is capable of delivering a direct current output across a pair of terminals.

While the embodiments of the present invention as herein disclosed, constitute a preferred form, it is to be understood that other forms might be adopted.

What is claimed is as follows:

1. A dynamoelectric machine comprising, first and second metal end frames, a stator assembly including a stator core and a three phase stator winding, said stator core being clamped between said end frames, said first end frame having an annular section located adjacent the end of said stator assembly and having another integral section of reduced diameter extending axially from said annular section, said axially extending section defining an open ended compartment which faces a portion of said stator assembly, a rotor member including a shaft journalled for rotation in said end frames, said shaft projecting through said compartment, a plurality of openings in an end wall portion of said axially extending section which defines a part of said compartment, said end wall portion being located substantially normal to said shaft, a first group of diodes each having an outer metal case positioned within said openings and having terminals projecting into said compartment, a metal heat sink located at least partially on one side of said shaft and within said compartment, said metal heat sink being supported by and electrically insulated from said end wall portion, a second group of diodes each having an outer metal case located in openings formed in said metal heat sink member, means connecting pairs of said diodes together and with said three phase stator winding to provide a three phase full-wave bridge rectifier network, all of said connections being made within said compartment, a first air inlet opening in said end wall portion, said first air inlet opening being located in alignment with at least a part of said metal heat sink, a second laterally extending air inlet opening located inwardly of said axially extending section and adjacent said annular section, said second air inlet opening permitting a free flow of air into an area adjacent said stator winding without passing through said compartment, and a fan driven by said shaft positioned outside of said second end frame, said second end frame having at least one air outlet opening located in alignment with said fan.

2. A dynamoelectric machine comprising, first and second metal end frames, a stator assembly including a stator core carrying a three-phase stator winding, said stator core being supported by said end frames, said first end frame having an annular section and another integral axially extending section, said axially extending section defining an open-ended compartment which faces a portion of said stator assembly, said open ended compartment being defined in part by an end wall which is located substantially normal to the longitudinal axis of said end frames, a rotor member including a shaft which is journalled for rotation in said end frames, said rotor member including a field winding connected with slip rings that are supported by said shaft, said slip rings being located within said compartment, a first group of diodes each having an outer metal case located in openings in said end wall, a metal heat sink located within said compartment and at least partially on one side of said slip rings, said metal heat sink being electrically insulated from said first end frame, a second group of diodes each having an outer metal case located in openings in said metal heat sink, means electrically connecting pairs of said diodes together and with the phase leads of said stator winding, said electrical connections between said pairs of diodes and said phase leads being all made within said compartment, a first air inlet opening located in said end wall and in alignment with at least a part of said metal heat sink, a second laterally extending air inlet opening located adjacent the annular section of said first end frame and inwardly of said axially extending section, said second air inlet opening communicating directly with an area located adjacent said stator winding, an air outlet opening located in said second end frame, a fan secured to said shaft and positioned outside of said second end frame for drawing air through said machine, and a brushholder located at least partially within said compartment, said brushholder carrying brushes which engage said slip rings, said brushholder being positioned on a side of said slip rings opposite from said metal heat sink.

3. The dynamoelectric machine according to claim 1 wherein said first air inlet opening is substantially U-shaped and wherein said metal heat sink has a shape which conforms to this opening.

4. The dynamoelectric machine according to claim 1 wherein the metal heat sink member lies in a plane which is substantially normal to said end portion of said axially extending section.

5. The dynamoelectric machine according to claim 2 wherein the brushholder carries a male terminal which is electrically connected with one of the brushes carried by said brushholder.

6. The dynamoelectric machine according to claim 1 wherein the metal heat sink is secured to said first end frame by metal fastener means one of which is electrically connected with the first end frame and the other of which is electrically insulated therefrom.

7. The dynamoelectric machine according to claim 1 wherein a plurality of second laterally extending air inlet openings are provided which are located inwardly of said axially extending section and adjacent said annular section.

8. The dynamoelectric machine according to claim 1 wherein the metal heat sink is substantially U-shaped and is located in planes which are substantially normal to said end wall portion of said axially extending section, said heat sink having extensions for securing said heat sink to said end wall portion.

References Cited in the file of this patent

UNITED STATES PATENTS

| | | |
|---|---|---|
| 2,934,662 | Robinson | Apr. 26, 1960 |
| 3,001,121 | Kerr | Sept. 19, 1961 |
| 3,041,484 | Freer et al. | June 26, 1962 |